(12) United States Patent
Lori et al.

(10) Patent No.: US 7,063,764 B1
(45) Date of Patent: Jun. 20, 2006

(54) APPARATUS AND METHOD FOR PRODUCING A POLYOLEFINIC TRANSPIRING FILM

(75) Inventors: Fabrizio Lori, Cerese Di Virgilio (IT); Graziano Bortoletto, Zero Branco (IT)

(73) Assignee: Nuova Pansac S.p.A., Milan (IL)

( * ) Notice: Subject to any disclaimer, the term of this patent is extended or adjusted under 35 U.S.C. 154(b) by 360 days.

(21) Appl. No.: 10/089,313

(22) PCT Filed: Oct. 31, 2000

(86) PCT No.: PCT/IB00/01572

§ 371 (c)(1),
(2), (4) Date: Mar. 29, 2002

(87) PCT Pub. No.: WO01/32394

PCT Pub. Date: May 10, 2001

(30) Foreign Application Priority Data

Nov. 5, 1999 (IT) .............................. MI99A2318

(51) Int. Cl.
*B29C 47/00* (2006.01)
*B29C 55/14* (2006.01)
*B29C 55/26* (2006.01)

(52) U.S. Cl. .................. 156/244.27; 156/500; 264/564; 264/290.2; 264/210.7

(58) Field of Classification Search ............... 264/514, 264/564, 290.2, DIG. 73, 210.7; 156/244.27, 156/244.14
See application file for complete search history.

(56) References Cited

U.S. PATENT DOCUMENTS

| 3,816,886 | A | * | 6/1974 | Van Cappellen | ............. | 26/106 |
| 4,277,594 | A | * | 7/1981 | Matthews et al. | .......... | 526/352 |
| 4,793,956 | A | * | 12/1988 | Nogiwa et al. | ................ | 264/41 |
| 4,878,974 | A | * | 11/1989 | Kagawa | ....................... | 156/85 |
| 6,610,163 | B1 | * | 8/2003 | Mathis | ....................... | 156/229 |

FOREIGN PATENT DOCUMENTS

GB 1074317 * 5/1967

* cited by examiner

*Primary Examiner*—Sam Chuan Yao
*Assistant Examiner*—Barbara J. Musser
(74) *Attorney, Agent, or Firm*—Bacon & Thomas

(57) ABSTRACT

The invention relates to a method and a plant for producing polyolefinic transpiring films by means of bubble extrusion of a LLDPE and filler mix, flattening of the extruded tube to obtain a double layer flat film and transversely and/or longitudinally stretching of the double layer flat film.

16 Claims, 1 Drawing Sheet

APPARATUS AND METHOD FOR PRODUCING A POLYOLEFINIC TRANSPIRING FILM

FIELD OF THE INVENTION

The present invention relates to an apparatus and method for producing a polyolefinic transpiring (semipermeable) film, capable of allowing vapour and air to pass therethrough while being impermeable to liquids.

THE PRIOR ART

EP 0.283.200 BI, to which reference is made for a general understanding of the prior art, describes a method for producing transpiring films in which an extruded linear low density polyethylene (LLDPE), containing $CaCO_3$, is first heat-embossed to provide reduced thickness imprints, and then stretched to obtain a transpiring film with a particularly elevated transpirability in the reduced thickness zones.

Transpiring films according to the prior art have various problems and drawbacks. One problem which is encountered in known polyolefinic transpiring films is the possible formation of micro-holes during the stretching of the film, which formation is due to the presence of impurities, in particular oxidised and carbonised particles. Such impurities may already be present in the mix to be extruded, or they may form during the extrusion of the polyethylene.

The micro-holes, which have an average diameter between 0.2 and 2 mm, may compromise the liquid impermeability characteristics, which risk increases with the speed of the stretching process and with increase in the degree of stretching of the film.

Another problem which is encountered in polyolefinic transpiring films is the non-uniformity of the transpirability.

SUMMARY OF THE INVENTION

Accordingly, a principle objective of the present invention is to provide a method and an apparatus for producing a polyolefinic transpiring film which overcome at least part of the above cited problems.

Accordingly, the present invention provides a method for producing a polyolefinic double layer transpiring film which allows vapour and air to pass therethrough while being impermeable to liquids, the method comprising the steps of: bubble extruding a mix of a polyolefin and a filler to form a tube; flattening the tube to obtain a double layer flat film having two layers; heating the double layer flat film to its softening temperature; compressing the double layer flat film to unite the layers of the double layer flat film; cooling the double layer flat film to a temperature between 8–30° C.; and transversely and/or longitudinally stretching the double layer flat film to impart transpirability.

The heating of the flat film may be first by conduction and then by irradiation.

In another aspect the present invention provides an apparatus for producing a stretched, transpiring polyolefinic double film comprising, in series: a bubble extruder; a first calender for flattening the extruded tube to form a double layer flat film having two layers; heating means for heating the double layer flat film to its softening temperature; a second calender for compressing the heated double layer flat film to unite the two layers; cooling means for quickly cooling the double layer flat film to a temperature between 8–30° C.; and stretching means for transversely and/or longitudinally stretching the double layer flat film to form the transpiring polyolefinic double film.

The heating means may include first heating means, adapted to heat the film by conduction; and second heating means adapted to heat the film by irradiation.

BRIEF DESCRIPTION OF THE DRAWING

The sole drawing figure is a schematic view illustrating apparatus as utilized in practice of the method of the present invention.

DESCRIPTION OF THE PREFERRED EMBODIMENTS

Figure 1:
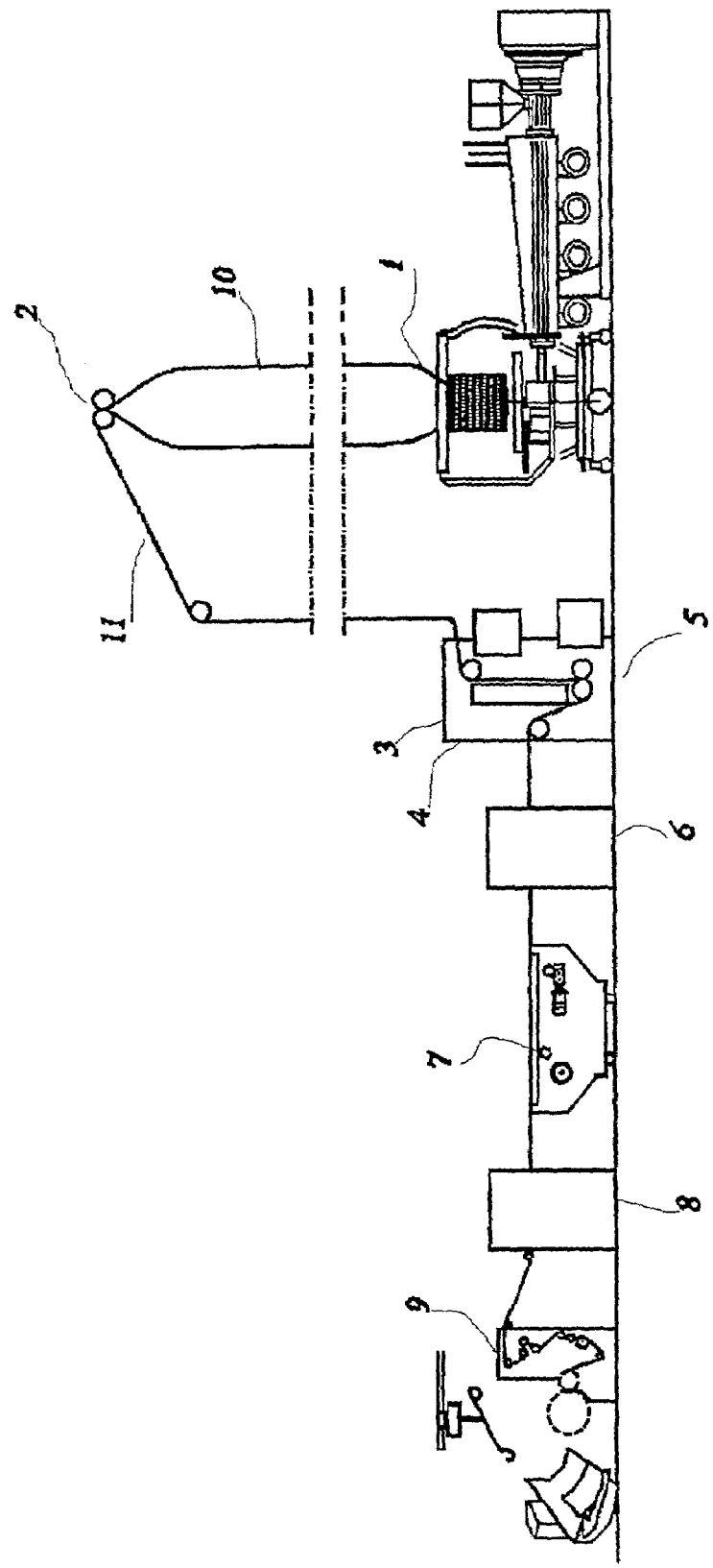

The method and the apparatus according to the invention will appear in a clear manner from the following description of one embodiment, provided purely as an example, with reference to the drawing figure which shows, in a schematic view, a manufacturing plant in accordance with the invention.

The present method provides for the use of a mix preferably of linear low density polyethylene (LLDPE) charged with $CaCO_3$.

It is possible to use either linear low density polyethylene (LLDPE) or medium density polyethylene (MDPE).

It is also possible to use copolymers of ethylene and an α-olefin with 4–10 carbon atoms (1-butene, 1-pentene, 1-hexene, 1-heptene, 4-methyl-1-pentene, 1-octene).

Naturally, it is also possible to use other fillers, organic or inorganic, having dimensions between 0.6 and 6 μm and treated in a way to render their surfaces hydrophopic. In particular, it is possible to use: clay, kaolin, zeolite, Zn, Al, Ca, $CaSO_4$, $BaSO_4$, MgO, $Mg(OH)_2$, $TiO_2$.

The quantity (charge) of the charged filler depends also on the degree of desired transpirability. Normally the filler constitutes from 30% to 70% by weight of the mix. Such mix is bubble-extruded (so-called blow moulding), by means of a circular-head extruder 1 in order to obtain a tube 10.

The temperature of the tube exiting from the extruder 1 is between 150–230° C. and, preferably, between 170–190° C.

The ratio of expansion of the tube 10 may vary between 1:2 and 1:4, and preferably is 1:3. One characteristic of the method of the present invention is the fact that the extruded and expanded tube 10 is subjected to a calendering operation. In detail, the tube 10 enters, at a temperature of about 80–100° C., a first calender 2 where it is compressed and stretched into the form of a sheet 11 of two superimposed layers, assuming a width equal to half of the circumference of the tube and a thickness which is double the thickness of the tube. Such a process has the advantage of resolving the problem of insufficient liquid impermeability due to the micro-holes which may form in the films during the stretching because it is extremely improbable that both the layers of the film will be damaged at the same point. The calender 2 used for flattening the tube 10 comprises a pair of smooth coupled rollers of which the first one is chromed steel and the second one is rubber with a hardness of 60–80 shore. The pressure supplied by the calender 2 on the flattened tube 10 varies between 5 and 10 kg/cm2.

A second characteristic of the method according to the invention is that, after having been flattened, the film 11 is heated to its softening temperature. Such temperature depends on the type of mix which is extruded, in the case of an LLDPE base mix it may vary between 80 and 130° C. and usually, it is around about 100° C. The heating executed in this manner favours the removal of moisture and additives present in the mix which have a low evaporation point. Moreover, the heating executed in this manner favours the elimination of micro-stresses present in the film due to the preceding steps of the method and favours homogenization of the internal structure of the film.

For heating, the film 11 is first run on heated rollers 3, having a temperature of about 60–70° C., and then passed near infrared ray lamps 4 which further increase the temperature up to the softening point. In fact the use of only heated rollers—normally heated with water or oil—does not allow the film to reach its softening temperature, or at least not without great difficulty.

The infrared lamps also provide the advantage of strongly heating the layer of air about the film 11 (typically up to 300–400° C.) which completely eliminates the residual humidity still present on the film 11.

A third characteristic of the method according to the invention consists in the fact that the film heated in this manner is further calendered by a calender 5 and, thereafter, cooled to a temperature between 8 and 30° C.

Such cooling is carried out, preferably, through contact with one of the rollers of the calender 5, which is maintained at a constant temperature between 8 and 30° C.

The further calendering, through the compression provided by the rollers, intimately unites the two original layers so as to avoid the risks of de-lamination of the film produced in this manner, and the thermal shock to which the film is subjected stops the stabilization process.

It is also possible, in this phase, to emboss the film for a purely aesthetic purpose which does not modify the weight of the film.

It has been found that the thermal shock to which the film is subjected provides improved transpirability during the successive stretching operations.

The compression of the film is obtained by coupling a chromed-steel roller with a rubber roller (hardness 60–80 shore).

After the process of stabilization, the film 11 is subjected to transverse and/or longitudinal stretching. For such purpose, the method employs appropriate means 6 adapted to carry out the transverse stretching and appropriate means 8 adapted to carry out the longitudinal stretching. In the illustrated example, the film 11 is subjected first to a transverse stretching and then to a longitudinal stretching. Naturally these stretchings may be reversed. Preferably between the transverse stretching means 6 and the longitudinal stretching means 8 there are provided tendering means 7 for eliminating the folds created by the first process of stretching. Normally, the ratio of longitudinal stretching varies between 1:1.5 and 1:2.5. Also in this manner, the ratio of longitudinal stretching varies, usually, between 1:1.5 and 1:2.5. However, if required, the ratio of stretching may be up to 1:4. At the end of the stretching, the film 11 may undergo further working steps or be wound up by an appropriate winding machine 9.

The invention claimed is:

1. A method for producing a polyolefinic double layer transpiring film which allows vapour and air to pass therethrough while being impermeable to liquids, said method comprising the steps of:
   bubble extruding a mix of a filler, which filler imparts transpirability upon stretching, and a polyolefin to form a tube;
   flattening the tube to obtain a double layer flat film having two layers;
   heating the double layer flat film to its softening temperature, wherein said heating of the double layer flat film to its softening temperature comprises first heating by conduction and then heating by irradiation;
   compressing the heated double layer flat film to unite the layers of the double layer film and thereby form a double layer laminate;
   then cooling the double layer flat film having united layers to a temperature between 8–30° C.; and then
   transversely and longitudinally stretching the cooled double layer flat film to impart transpirability to the double layer flat film.

2. A method according to claim 1 wherein the filler is 30% to 70% by weight of the mix.

3. A method according to claim 2 wherein said filler has dimensions between 0.6 and 6 μm and has surfaces which are hydrophobic.

4. A method according to claim 3 wherein said filler is selected from the group consisting of $CaCO_3$, clay, kaolin, zeolites, Zn, Al, $CaSO_4$, $BaSO_4$, MgO, $Mg(OH)_2$ and $TiO_2$.

5. A method according to claim 1 wherein said polyolefin is selected from the group consisting of polyethylene and copolymers of ethylene and an alpha-olefin.

6. A method according to claim 5 wherein said filler has dimensions between 0.6 and 6 μm and has surfaces which are hydrophobic.

7. A method according to claim 6 wherein said filler is selected from the group consisting of $CaCO_3$, clay, kaolin, zeolites, Zn, Al, $CaSO_4$, $BaSO_4$, MgO, $Mg(OH)_2$ and $TiO_2$.

8. A method according to claim 1 wherein said polyolefin is linear low density polyethylene or medium density polyethylene.

9. A method according to claim 8 wherein said filler has dimensions between 0.6 and 6 μm and has surfaces which are hydrophobic.

10. A method according to claim 9 wherein said filler is selected from the group consisting of $CaCO_3$, clay, kaolin, zeolites, Zn, Al, $CaSO_4$, $BaSO_4$, MgO, $Mg(OH)_2$ and $TiO_2$.

11. A method according to claim 1 wherein said filler has dimensions between 0.6 and 6 μm and has surfaces which are hydrophobic.

12. A method according to claim 11 wherein said filler is selected from the group consisting of $CaCO_3$, clay, kaolin, zeolites, Zn, Al, $CaSO_4$, $BaSO_4$, MgO, $Mg(OH)_2$ and $TiO_2$.

13. A method according to claim 1 wherein said cooling is by contacting the double layer flat film having united layers with a calender roller.

14. A method according to claim 13 wherein the calender roller is at a temperature between 8° C. and 30° C.

15. An apparatus for producing a stretched double layer polyolefinic transpiring film which allows vapour and air to pass therethrough while being impermeable to liquids, said apparatus comprising, arranged successively in series;
   a bubble extruder for extruding a tube;
   a first calender for flattening the extruded tube to obtain a double layer flat film;
   heating means for heating the double layer flat film to its softening temperature, said heating means comprising, arranged in series, conductive heating means for heating the double layer flat film by conduction and radiant heating means for heating the double layer flat film by irradiation;
   a second calender for compressing the heated double layer flat film to unite the layers of the double layer flat film;
   cooling means for quickly cooling the double layer flat film with united layers to a temperature between 8–30° C.; and
   stretching means for transversely and longitudinally stretching the double layer flat film to impart transpirability to the double layer flat film.

16. An apparatus according to claim 15 wherein said cooling means is a calender roller.

* * * * *